US012570225B2

(12) United States Patent
Vangoethem et al.

(10) Patent No.: US 12,570,225 B2
(45) Date of Patent: Mar. 10, 2026

(54) ELASTIC COMPUTING FOR IN-VEHICLE COMPUTING SYSTEMS

(71) Applicant: Harman International Industries, Incorporated, Stamford, CT (US)

(72) Inventors: Timothy Raymond Vangoethem, Milford, MI (US); Günther Kraft, Karlsruhe (DE)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 650 days.

(21) Appl. No.: 17/594,324

(22) PCT Filed: Apr. 10, 2020

(86) PCT No.: PCT/US2020/027808
§ 371 (c)(1),
(2) Date: Oct. 11, 2021

(87) PCT Pub. No.: WO2020/210729
PCT Pub. Date: Oct. 15, 2020

(65) Prior Publication Data
US 2022/0161744 A1     May 26, 2022

(51) Int. Cl.
*B60R 16/02*     (2006.01)
*B60R 16/023*     (2006.01)
(Continued)

(52) U.S. Cl.
CPC .......... *B60R 16/0231* (2013.01); *B60R 16/02* (2013.01); *B60R 16/0315* (2013.01);
(Continued)

(58) Field of Classification Search
None
See application file for complete search history.

(56) References Cited

U.S. PATENT DOCUMENTS 10,127,161 B2 * 11/2018 Wegner .............. G06F 11/0724
2007/0061809 A1 3/2007 Dodge et al.
(Continued)

FOREIGN PATENT DOCUMENTS

CN     206021026 U * 3/2017
CN     111149094 A * 5/2020 ............ G06F 11/167
(Continued)

OTHER PUBLICATIONS

ISA Korean Intellectual Property Office, International Search Report and Written Opinion Issued in Application No. PCT/US2020/027808, Jul. 24, 2020, WIPO, 13 pages.
(Continued)

*Primary Examiner* — Abu Zar Ghaffari
(74) *Attorney, Agent, or Firm* — McCoy Russell LLP

(57) ABSTRACT

Options are disclosed for in-vehicle systems and methods of allocating local and remote hardware computing resources. One such system for controlling a vehicle includes a first computing device physically positioned in the vehicle, a second computing device positioned away from the vehicle, and an elastic computing module communicatively coupled to the first computing device and the second computing device, the elastic computing module configured to: determine computing and memory capacities of the first computing device and the second computing device; determine software demands of a software application for controlling a component of the vehicle; and dynamically allocate processing of the software application to the first computing device and/or the second computing device based on the computing and memory capacities of the first and second computing devices and the software demands of the software application.

17 Claims, 8 Drawing Sheets

(51) Int. Cl.

| | | |
|---|---|---|
| *B60R 16/03* | (2006.01) | |
| *G06F 9/455* | (2018.01) | |
| *G06F 9/50* | (2006.01) | |
| *G06F 11/00* | (2006.01) | |
| *G06F 15/173* | (2006.01) | |
| *G06F 15/78* | (2006.01) | |
| *G06F 21/60* | (2013.01) | |

(52) U.S. Cl.
CPC ........ *G06F 9/45545* (2013.01); *G06F 9/5077* (2013.01); *G06F 11/004* (2013.01); *G06F 15/173* (2013.01); *G06F 15/7807* (2013.01); *G06F 21/604* (2013.01); *G06F 9/5044* (2013.01); *G06F 9/5055* (2013.01); *G06F 9/5072* (2013.01); *G06F 2209/503* (2013.01)

(56) References Cited

U.S. PATENT DOCUMENTS

| | | | | |
|---|---|---|---|---|
| 2012/0011510 | A1* | 1/2012 | Yamakabe | G06F 9/5072 |
| | | | | 718/1 |
| 2012/0057266 | A1* | 3/2012 | Kasztenny | H02H 3/04 |
| | | | | 361/170 |
| 2012/0179823 | A1* | 7/2012 | Hatasaki | G06F 3/06 |
| | | | | 709/226 |
| 2014/0176583 | A1 | 6/2014 | Abiezzi et al. | |
| 2014/0289437 | A1* | 9/2014 | Myrah | G06F 3/0628 |
| | | | | 710/261 |
| 2014/0375447 | A1* | 12/2014 | Raghunathan | B60K 35/00 |
| | | | | 340/462 |
| 2016/0264115 | A1* | 9/2016 | Schwindt | B60T 8/885 |
| 2016/0328254 | A1* | 11/2016 | Ahmed | G06F 9/45545 |
| 2016/0328272 | A1 | 11/2016 | Ahmed et al. | |
| 2017/0339267 | A1* | 11/2017 | Shan | H04W 4/38 |
| 2018/0074859 | A1 | 3/2018 | Williams et al. | |
| 2018/0203823 | A1* | 7/2018 | Ito | G06F 15/167 |
| 2018/0208060 | A1* | 7/2018 | Kim | B60K 35/00 |
| 2018/0300964 | A1* | 10/2018 | Lakshamanan | H04L 67/12 |
| 2018/0314250 | A1* | 11/2018 | Lewis | G06N 3/008 |
| 2018/0332524 | A1 * | 11/2018 | Rasanen | H04W 36/00835 |
| 2018/0370540 | A1* | 12/2018 | Yousuf | B60W 10/04 |
| 2019/0027111 | A1* | 1/2019 | Wilde | H04W 4/21 |
| 2019/0079659 | A1* | 3/2019 | Adenwala | H04W 4/46 |
| 2019/0096243 | A1* | 3/2019 | Doig | G08G 1/09 |
| 2019/0171538 | A1* | 6/2019 | Gulati | G06T 1/20 |
| 2019/0210463 | A1* | 7/2019 | Snyder | H04L 67/10 |
| 2019/0222484 | A1* | 7/2019 | Ricci | G07C 5/0825 |
| 2019/0222652 | A1* | 7/2019 | Graefe | H04L 67/12 |
| 2019/0227553 | A1* | 7/2019 | Kentley-Klay | B60Q 3/00 |
| 2019/0229990 | A1* | 7/2019 | Patel | H04L 41/40 |
| 2019/0258251 | A1* | 8/2019 | Ditty | G05D 1/0274 |
| 2019/0303759 | A1* | 10/2019 | Farabet | G06F 9/455 |
| 2020/0148219 | A1* | 5/2020 | DeLuca | G06F 16/29 |
| 2020/0192603 | A1* | 6/2020 | Tanriover | G06F 3/0659 |
| 2020/0223383 | A1* | 7/2020 | Awad Alla | B60W 10/20 |
| 2020/0272509 | A1* | 8/2020 | Wright | G06F 9/5038 |

FOREIGN PATENT DOCUMENTS

| | | | |
|---|---|---|---|
| JP | 2014193690 | A | 10/2014 |
| JP | 2015176292 | A | 10/2015 |
| JP | 2017171114 | A | 9/2017 |
| KR | 20100041309 | A | 4/2010 |
| WO | 2018193439 | A1 | 10/2018 |

OTHER PUBLICATIONS

Lee, E. et al., "Vehicular cloud networking: architecture and design principles," IEEE Communications Magazine, vol. 52, No. 2, Feb. 12, 2014, 8 pages.

Ashok, A. et al., "Adaptive cloud offloading for vehicular applications," Proceedings of the 2016 IEEE Vehicular Networking Conference (VNC), Dec. 8, 2016, Columbus, Ohio, 8 pages.

Li, Z. et al., "Cloud resource allocation for cloud-based automotive applications," Mechatronics, vol. 50, Apr. 2018, 10 pages.

European Patent Office, Extended European Search Report Issued in Application No. 20788570.8, Nov. 10, 2022, Germany, 11 pages.

Japanese Patent Office, Office Action Issued in Application No. 2021-558660, Nov. 14, 2023, 12 pages.

Japan Patent Office, Office Action Issued in Application No. 2021-558660, Jun. 4, 2024, 8 pages.

* cited by examiner

ELASTIC COMPUTING FOR IN-VEHICLE COMPUTING SYSTEMS

CROSS-REFERENCE TO RELATED APPLICATIONS

The present application is a U.S. National Phase of International Patent Application Serial No. PCT/US2020/027808, entitled "ELASTIC COMPUTING FOR IN-VE-HICLE COMPUTING SYSTEMS," and filed on Apr. 10, 2020. International Patent Application Serial No. PCT/US2020/027808 claims priority to U.S. Provisional Patent Application No. 62/833,598, entitled "ELASTIC COMPUT-ING FOR IN-VEHICLE COMPUTING SYSTEMS," and filed on Apr. 12, 2019. The entire contents of the above-listed applications are hereby incorporated by reference for all purposes.

FIELD

The disclosure relates to an in-vehicle interface system and associated controls.

BACKGROUND

Vehicles may include an in-vehicle computing system, such as a head unit for an infotainment system, which may provide multimedia and control functions. For example, an in-vehicle computing system may provide navigational, multimedia playback, telephonic, social media interactive, mobile device charging, and/or other functions and receive user input to control elements of the vehicle and in-vehicle computing system. In order to provide such functionality, in-vehicle computing systems include complex and costly processing and memory resources that enable the execution of an operating system and various applications.

SUMMARY

In order to provide sufficient processing and memory resources for enabling the sophisticated multimedia func-tionality and vehicle control, a vehicle may be communica-tively coupled to external computing resources, such as cloud computing resources. However, such remote process-ing may often be unnecessary when sufficient computing resources are locally available, and consequently the load may be unbalanced between local processing and remote processing. Further, in some instances, additional computing capacity may be needed. To overcome such limitations, elastic computing may dynamically allocate computing resources according to processing needs.

Embodiments are disclosed for in-vehicle systems and methods of allocating local and remote hardware computing resources. An example system for controlling a vehicle includes a first computing device physically positioned in the vehicle, a second computing device positioned away from the vehicle, and an elastic computing module commu-nicatively coupled to the first computing device and the second computing device, the elastic computing module configured to: determine computing and memory capacities of the first computing device and the second computing device; determine software demands of a software applica-tion for controlling a component of the vehicle; and dynami-cally allocate processing of the software application to the first computing device and/or the second computing device based on the computing and memory capacities of the first and second computing devices and the software demands of the software application.

BRIEF DESCRIPTION OF THE DRAWINGS

The disclosure may be better understood from reading the following description of non-limiting embodiments, with reference to the attached drawings, wherein below.

DETAILED DESCRIPTION

Domain partitioning, computing clustering approaches, elastic computing, and electronics partitioning may reduce the cost and complexity of providing a full suite of sophis-ticated software for in-vehicle control, as described further herein.

As used herein, terminology in which "an embodiment," "some embodiments," or "various embodiments" are refer-enced signify that the associated features, structures, or characteristics being described are in at least some embodi-ments, but are not necessarily in all embodiments. More-over, the various appearances of such terminology do not necessarily all refer to the same embodiments. Also, termi-nology in which elements are presented in a list using "and/or" language means any combination of the listed elements. For example, "A, B, and/or C" may mean any of the following: A alone; B alone; C alone; A and B; A and C; B and C; or A, B, and C.

Figure 1:
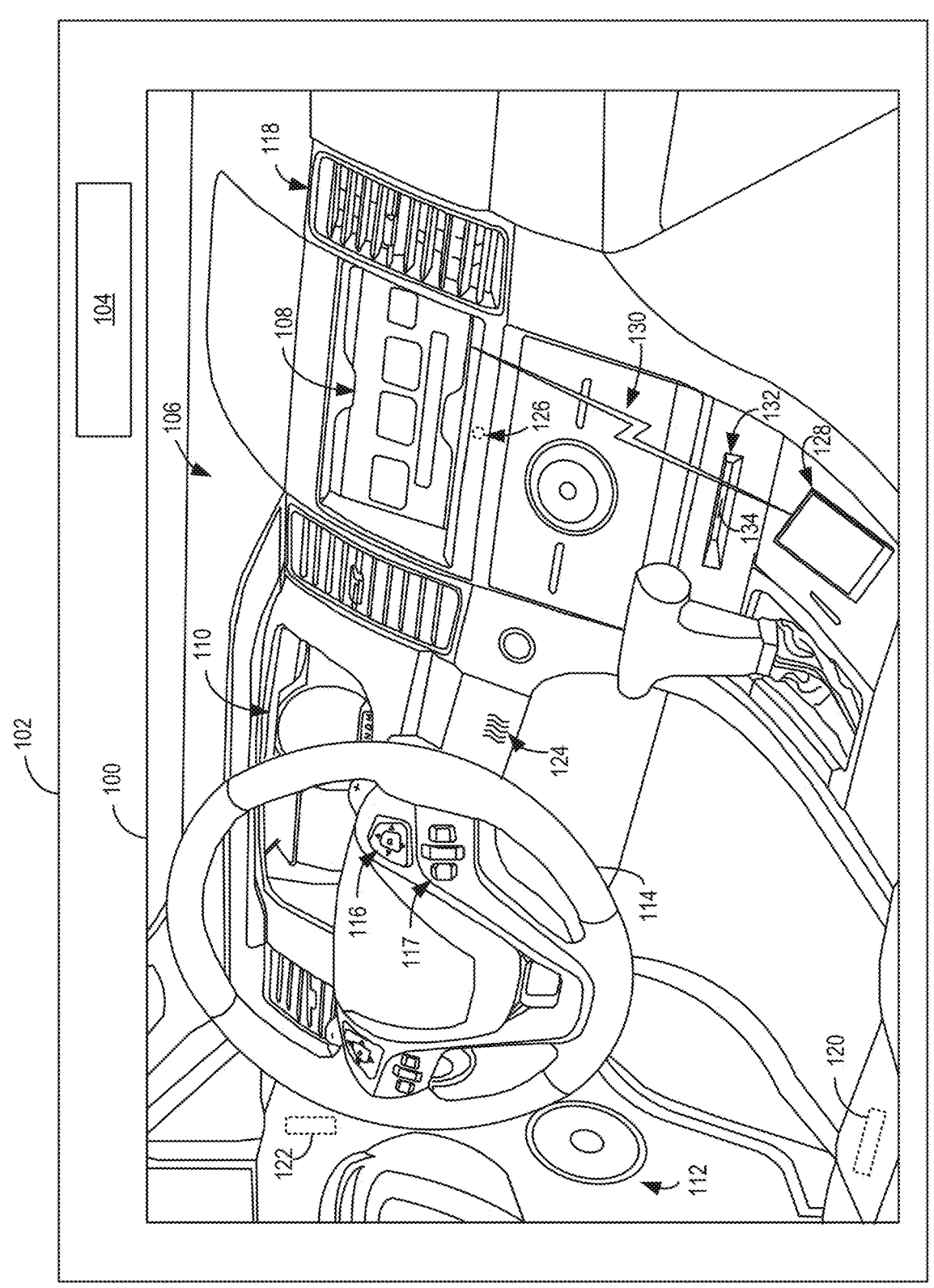
FIG. 1 is a partial view of a vehicle cabin including an in-vehicle computing system and a mobile device, in accor-dance with one or more embodiments of the present disclo-sure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver of vehicle 102, such as a touch screen 108 of an in-vehicle interface system (e.g., an infotainment system), an audio system control panel, and an instrument cluster 110. While the example system shown in FIG. 1 includes audio system controls that may be performed via a user interface of an in-vehicle interface system (such as touch screen 108) without a separate audio system control panel, in other embodiments, vehicle 102 may include an audio system control panel, which may include controls for a conventional vehicle audio system such as a radio, compact disc player, MP3 player, and so on. The audio system controls may include features for controlling one or more aspects of audio output via one or more speakers 112 of a vehicle speaker system. For example, the audio system controls may control a volume of audio input, a distribution of sound among the individual speakers of the vehicle speaker system, an equalization of audio signals, and/or any other aspect of the audio output.

Instrument cluster 110 may include various gauges such as a fuel gauge, tachometer, speedometer, and odometer, as well as indicators and warning lights. A steering wheel 114 may project from instrument panel 106 below instrument cluster 110. Optionally, steering wheel 114 may include one or more controls 116 which may be used in conjunction with touch screen 108 to navigate features of an in-vehicle interface system and to control the in-vehicle interface system. As an illustrative example, controls 116 may include a button 117 which activates or initiates voice control of the in-vehicle interface system. For example, responsive to button 117 being pressed and/or while button 117 is being pressed, a microphone 126 may record one or more utterances by a driver or other passenger of the vehicle. The one or more utterances recorded via microphone 126 may then be used to navigate or control one or more features of the in-vehicle interface system if the one or more utterances comprises a voice command.

In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate via one or more climate control system vents 118 may be performed using touch screen 108 and thus no separate climate control interface may be included in instrument panel 106. In alternative embodiments, however, a separate climate control interface may be provided.

Cabin 100 may include one or more sensors for monitoring the vehicle, the user, and/or the environment. For example, cabin 100 may include one or more seat-mounted pressure sensors 120 configured to measure the pressure applied to the seat to determine the presence of a user. Cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of cabin 100. Microphone 126 may receive user input in the form of voice commands, to enable a user to conduct telephone calls, and/or to measure ambient noise in cabin 100. It is to be understood that the placement of the sensors illustrated in FIG. 1 is exemplary, and one or more additional or alternative sensors may be positioned in an engine compartment, on an external surface of the vehicle, and/or in other suitable locations for providing information regarding the operation of the vehicle, ambient conditions of the vehicle, a user of the vehicle, and so on.

Cabin 100 may also include one or more user objects, such as a mobile device 128, that are stored in the vehicle before, during and/or after traveling. Mobile device 128 may include a smart phone, a tablet, a laptop computer, a portable media player, and/or any suitable mobile computing device. Mobile device 128 may be connected to the in-vehicle interface system via a communication link 130. Communication link 130 may be wired (e.g., via Universal Serial Bus [USB], Mobile High-Definition Link [MHL], High-Definition Multimedia Interface [HDMI], and so on) or wireless (e.g., via BLUETOOTH, WI-FI, Near-Field Communication [NFC], and so on) and configured to provide two-way communication between mobile device 128 and the in-vehicle interface system. For example, communication link 130 may provide sensor and/or control signals from in-vehicle systems and touch screen 108 to the mobile device 128, and may provide control and/or display signals from mobile device 128 to in-vehicle systems and touch screen 108. Communication link 130 may also provide power to mobile device 128 from an in-vehicle power source in order to charge an internal battery of mobile device 128.

While mobile device 128 is illustrated as being spatially separated from the in-vehicle interface system and connected via a substantially external communication link (e.g., a cable or radiofrequency signal), it is to be understood that a mobile device storage structure 132 or other storage structure may be formed in instrument panel 106 or another location in the vehicle to hold mobile device 128 in a particular location. Mobile device storage structure 132 may include an integrated connector 134 to which mobile device 128 may be attached or "docked" for providing a substantially internal communication link between mobile device 128 and the interface system.

Figure 2:
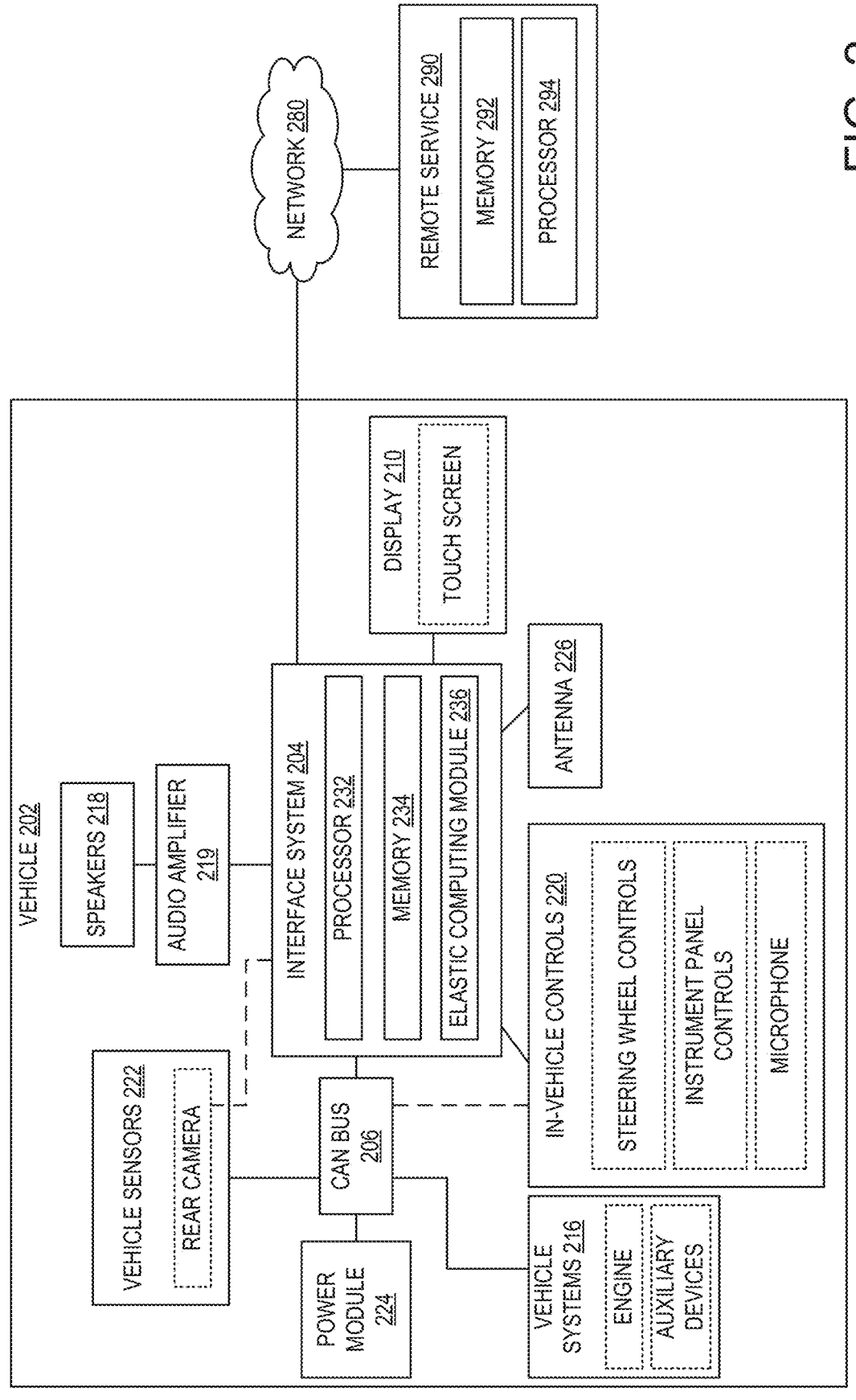
FIG. 2 is a block diagram of an in-vehicle interface system and related elements with which the in-vehicle interface system is in communication, in accordance with one or more embodiments of the present disclosure.

FIG. 2 shows a block diagram of an in-vehicle interface system 204 and related elements with which in-vehicle interface system 204 is in communication. In-vehicle interface system 204 may be located and/or integrated within a vehicle 202, such as vehicle 102 of FIG. 1. In-vehicle interface system 204 may communicate with one or more elements within the vehicle, including but not limited to vehicle systems connected via an in-vehicle interconnect, such as a Controller-Area-Network (CAN) bus 206. It is to be understood that any suitable number and/or combination of interconnects may be used to permit communication between in-vehicle interface system 204 (which may be referred to herein simply as interface system 204) and various in-vehicle components, including but not limited to CAN buses, Media Oriented Systems Transport (MOST) buses, Ethernet-based interconnects, and so on. Interconnects may communicate directly with in-vehicle components and/or may communicate with such components via intervening processors. In some embodiments, one or more in-vehicle components may communicate directly with interface system 204 without or in addition to communicating with interface system 204 via CAN bus 206.

Interface system 204 may pass information from CAN bus 206 to an external remote service 290, such as a cloud computing service or an edge device communicatively coupled to vehicle 202 via a wireless network 280, in order to leverage a memory 292 and a processor 294 as well as other computing resources of remote service 290 for controlling various in-vehicle elements of vehicle 202. In some embodiments, interface system 204 may include a wireless gateway and/or a protocol, enabling wireless connectivity between interface system 204 and remote service 290.

A display 210 may display images to provide visual feedback related to navigation, media playback, telephone, vehicle system control (e.g., cabin temperature control, cruise control settings, odometer output/settings, vehicle diagnostics control, vehicle operating mode control, and so on), and/or other vehicle-related functions. In some embodiments, display 210 may include a touch screen, such as touch screen 108 of FIG. 1, enabling user input for controlling the vehicle-related functions to be received via display 210.

Remote service 290 may receive signals from interface system 204 and/or display 210, process the signals based on non-transitory instructions stored on memory 292 and executed by processor 294, and output display and/or control signals to display 210 and/or interface system 204. Although one remote service 290 is illustrated in FIG. 2, it is to be understood that vehicle 202 may communicate with one or more remote services including remote service 290 during operation.

As illustrated, remote service 290 is separate from and not integrated within vehicle 202. In contrast, each of the other systems and elements illustrated within vehicle 202 in FIG. 2 may be integrated within vehicle 202. Remote service 290 may include computing resources (e.g., memory 292 and processor 294) that are separate from computing resources integrated within vehicle 202 (e.g., the computing resources utilized by the components illustrated within vehicle 202 of FIG. 2).

Display signals may control the output of display 210, while control signals may control one or more other vehicle systems 216 in communication with interface system 204. For example, vehicle systems 216 may include controllable elements related to the engine and/or auxiliary elements, such as windshield wipers, windows, doors/door locks, headlights, air conditioning systems, and so on. The control signals may also control audio output at one or more speakers 218 of vehicle 202. For example, the control signals may adjust audio output characteristics such as volume, equalization, audio image (e.g., the configuration of the audio signals to produce audio output that appears to a user to originate from one or more defined locations), audio distribution among speakers 218, and so on.

User input may be accepted via one or more in-vehicle controls 220 transmitted to interface system 204 and/or remote service 290 as additional or alternative input sources to the optional touch screen of display 210, for example. In-vehicle controls 220 may include any suitable useractuatable element within and/or on the vehicle, including but not limited to any number or combination of buttons, sliders, switches, knobs, levers, joysticks, key pads, pedals, and so on. For example, in-vehicle controls 220 may include control elements within a cabin of vehicle 202, such as steering wheel controls (e.g., steering wheel-mounted audio system controls, cruise controls, windshield wiper controls, headlight controls, turn signal controls, and so on), instrument panel controls, accelerator/brake/clutch pedals, a gear shift, door/window controls positioned in a driver or passenger door, seat controls, cabin light controls, audio system controls, cabin temperature controls, and so on. Control elements positioned on an outside of a vehicle (e.g., controls for a security system) may also be connected to interface system 204 via CAN bus 206. The control elements of in-vehicle controls 220 may be physically and permanently positioned on and/or in the vehicle for receiving user input.

As a specific example, in-vehicle controls 220 may include a microphone integrated within the cabin of vehicle 202 which records or senses user input such as voice control commands that are routed to interface system 204 and/or remote service 290. As another example, the steering wheel controls and/or the instrument panel controls of in-vehicle controls 220 may include button 117 depicted in FIG. 1 for initiating voice control, wherein pressing the button 117 indicates that utterances sensed by the microphone comprise voice commands. In this way, utterances not intended for voice control of vehicle elements may not be inadvertently processed by the interface system 204 and/or remote service 290 for controlling one or more elements of vehicle 202. Additionally, or alternatively, the user may indicate that an utterance is intended for voice control by uttering a wake word (e.g., a particular voice data string, which may be a word, phrase, tone, or other predefined sound) for voice control. For example, interface system 204 and/or remote service 290 may monitor audio recorded by the microphone and specifically process the audio to detect the wake word without otherwise processing or handling the audio, and in response to detecting the wake word being uttered by an occupant of vehicle 202, interface system 204 and/or remote service 290 may process an utterance sensed by the microphone and following the wake word or trigger word.

CAN bus 206 may communicate with one or more vehicle sensors 222 in order to provide an indication of operating states and/or conditions of the vehicle to interface system 204. Interface system 204 may pass the sensor signals from vehicle sensors 222 to remote service 290 in order to provide contextual information relating to the operation and/or environment of the vehicle and/or user to remote service 290. Vehicle sensors 222 may include any suitable sensor, such as the in-cabin sensors described herein above with regard to FIG. 1, vehicle operating state sensors (e.g., sensors monitoring fuel storage, engine temperature, oil storage, engine speed, vehicle speed, transmission/gear settings, tire pressure, traction, diagnostics information, and so on), and environmental sensors (e.g., a rear camera and/or other sensors monitoring ambient conditions, such as temperature, humidity, pressure, road surface/conditions, and so on). Upon receiving the user input and/or the sensor signals at remote service 290, remote service 290 may determine an adjustment to display 210 and/or control instructions for vehicle systems 216.

Information regarding power states and/or power control signals may be exchanged between a power module 224 and remote service 290 via CAN bus 206 and interface system 204. For example, remote service 290 may receive information from power module 224 and update display 210 to provide feedback to the user regarding the power state of the one or more vehicle components. Remote service 290 may additionally or alternatively provide control signals to power module 224 based on user input, information received from vehicle sensors 222, and/or information received from power module 224.

An antenna 226 may provide AM/FM radio signals to interface system 204 for processing at interface system 204. For example, interface system 204 may control speakers 218 to control audio broadcast by AM/FM radio stations, and may control display 210 to display information related to the AM/FM radio stations and/or content being broadcast (e.g., information broadcast alongside the audio via a radio data system).

In order to communicate with the varied vehicle systems and remove service 290 as described above, interface system 204 may include one or more modules in some embodiments for resolving different communication protocols and other issues that may arise while passing signals between disparate systems. For example, interface system 204 may include a video switching module (not shown) to synchronize and/or format a video feed from a rear camera for display on display 210. As another example, interface system 204 may include an encoder (not shown) and/or a decoder (not shown) for converting signals received from one system and/or device to a format that is compatible with or otherwise able to be interpreted by a target system and/or device. It is to be understood that one or more of the above-described modules are optional, and in some embodiments, interface system 204 may pass received signals to another system and/or device without providing any adjustment to the signals.

Interface system 204 includes at least a processor 232 and a memory 234 configured to provide the functionality described herein. In some examples, the interface system 204 includes a plurality of processors 232 and a plurality of memories 234. Further, the interface system 204 includes an elastic computing module 236.

Elastic computing module 236 evaluates the parameters of the in-vehicle hardware, including the computing and memory capacity of processor 232 and memory 234, which System-on-Chip (SoC) architectures of processor 232 the in-vehicle peripherals are connected to, bus speeds, battery level, temperature, and so on, as well as the parameters of the remote service, such as the computing and memory capacity of processor 294 and memory 292 of remote service 290, edge-to-edge latency, cost models, and so on. Elastic computing module 236 further evaluates the needs for each of the software components, such as the computation bandwidth, memory, in/out, latency tolerance, safety, security, and so on.

Elastic computing module 236 determines which software is executed in vehicle 202 and which software is executed in remote service 290. Elastic computing module 236 further dynamically allocates the resources to deterministically meet the software needs and load balance the system.

Elastic computing module 236 establishes guest environments for software running in vehicle 202, such that "guest" users operating vehicle 202 may access or control vehicle 202 accordingly, with limited access. Elastic computing module 236 further controls access to shared peripherals.

Figure 3:
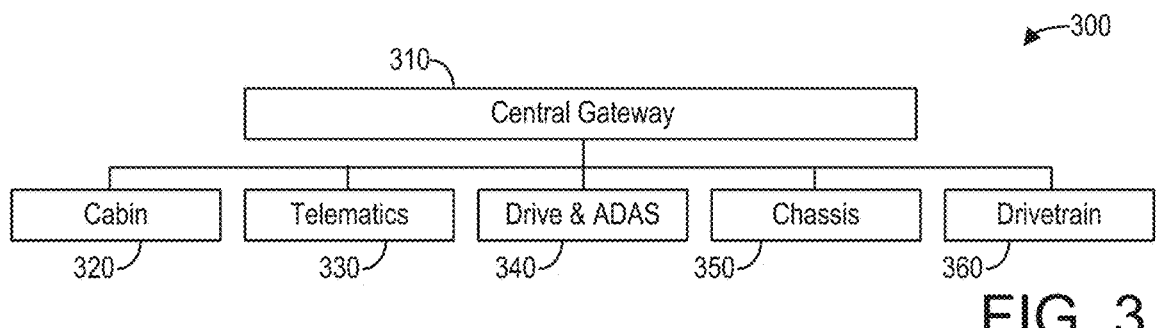
FIG. 3 is a block diagram of domain-based partitioning of software processing, in accordance with one or more embodiments of the present disclosure.

FIG. 3 is a block diagram depicting an example architecture 300 for domain-based partitioning of software processing. The architecture 300 includes a central gateway 310 communicatively coupled to a cabin module 320, a telematics module 330, a drive & Advanced Driver Assistant Systems (ADAS) module 340, a chassis module 350, and a drivetrain module 360. Each component of FIG. 3 may be implemented on separate processors, separate SoC architectures on a single processor, or a combination thereof. Further, elastic computing module 236 as described herein may dynamically allocate additional processors in a cloud computing system (such as remote service 290) for extending the processing capability of a given module.

Cabin module 320 may handle, as illustrative and non-limiting examples, processing relating to BYOD, cluster, displays (main, cluster, HUD, RSE), communication audio, DMS/OMS, door control, eMirror, entertainment audio, HVAC, infotainment, interior lighting, noise management, seat control, sound amplification, surround view/parking, vehicle sound (chimes, etc.), and so on.

Telematics module 330 may handle, as illustrative and non-limiting examples, processing relating to 4/5G connectivity, antennas, Bluetooth/BLE, beam steering, C-V2X, e-Call, electronic tolling, firewall(s), GNSS, OTA gateway, Wi-Fi, and so on.

Drive & ADAS module 340 may handle, as illustrative and non-limiting examples, processing relating to ADAS such as front-facing camera, short/long range radar, eMirror, and so on, as well as DMS/OMS, automated parking, highway pilot, evasive steering assistant, intelligent intersection crossing, surround view/parking, and so on.

Chassis module 350 may handle, as illustrative and non-limiting examples, processing relating to airbag control, exterior lighting, power steering, stability control, suspension, tire pressure monitoring, turn signals, wiper control, and so on.

Drivetrain module 360 may handle, as illustrative and non-limiting examples, processing relating to battery and fuel management, braking, engine/motor control, traction control, and transmission control.

Thus, software processing may be partitioned according to domains such that domain-specific processing is carried out by one or more modules as described above. The arrangement of the modules may be dynamically changed according to processing resources and needs. Further, the hardware implementation of the modules may vary according to different embodiments, as depicted in FIGS. 4-6.

Figure 4:
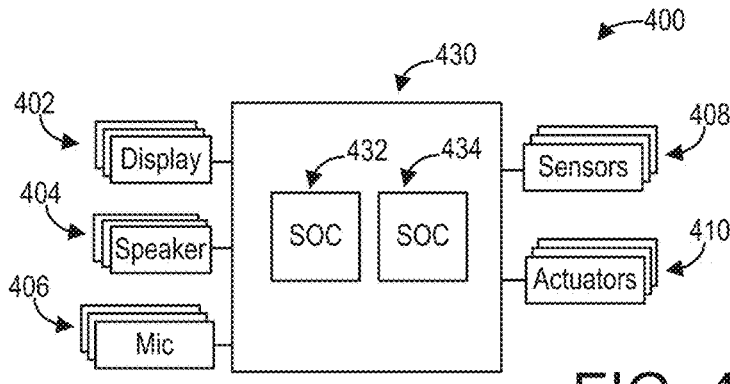
FIG. 4 is a block diagram of a computing cluster approach with a single processor, in accordance with one or more embodiments of the present disclosure.

In particular, FIG. 4 is a block diagram 400 of a computing cluster approach with a single processor 430, in accordance with one or more embodiments of the present disclosure. A plurality of display devices 402, speakers 404, microphones 406, sensors 408, and actuators 410 may be communicatively coupled to processor 430. Processor 430 may include two or more SoC architectures such as an SoC 432 and an SoC 434. One or more modules described hereinabove with regard to FIG. 3 may be implemented on SoC 432, while other modules may be implemented on SoC 434.

Figure 5:
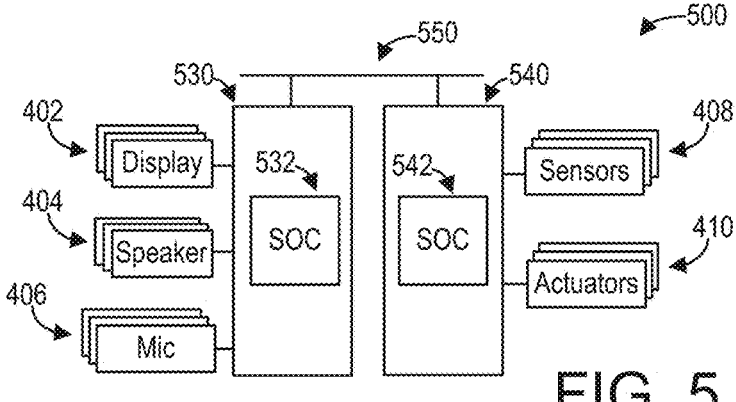
FIG. 5 is a block diagram of a computing cluster approach with multiple processors, in accordance with one or more embodiments of the present disclosure.

As another example, FIG. 5 is a block diagram 500 of a computing cluster approach with multiple processors including a processor 530 and a processor 540, in accordance with one or more embodiments of the present disclosure. Rather than a single processor with multiple SoCs (e.g., processor 430 with SoCs 432 and 434), processor 530 includes one or more SoCs 532 while processor 540 includes one or more SoCs 542. Processors 530 and 540 may both be physically installed in vehicle 202, for example, and may be communicatively coupled via a peripheral component interconnect express (PCIe) or similar backplane 550 providing a high-speed interface between processors 530 and 540.

Figure 6:
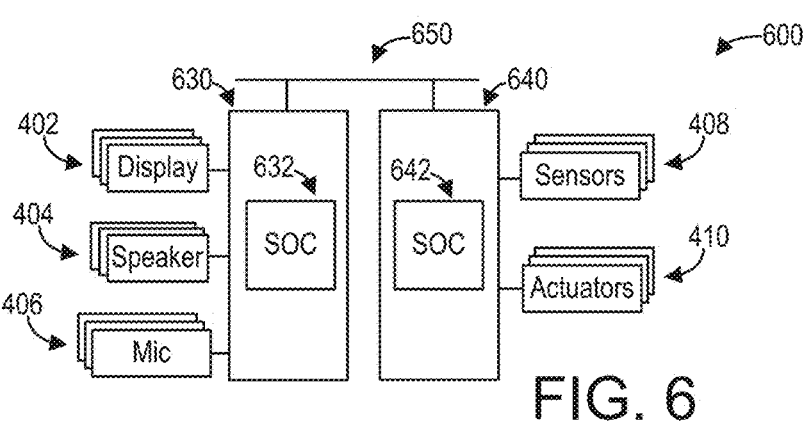
FIG. 6 is a block diagram of a computing cluster approach with multiple processors coupled by a network, in accor-dance with one or more embodiments of the present disclo-sure.

As another example, FIG. 6 is a block diagram 600 of a computing cluster approach with multiple processors 630 and 640 coupled by a network 650, in accordance with one or more embodiments of the present disclosure. Similar to the approach depicted in FIG. 5, processor 630 includes one or more SoCs 632 while processor 640 includes one or more SoCs 642. Network 650 may comprise a multi-gigabit Ethernet connection, thereby providing a high-speed interface between processors 630 and 640.

Figure 7:
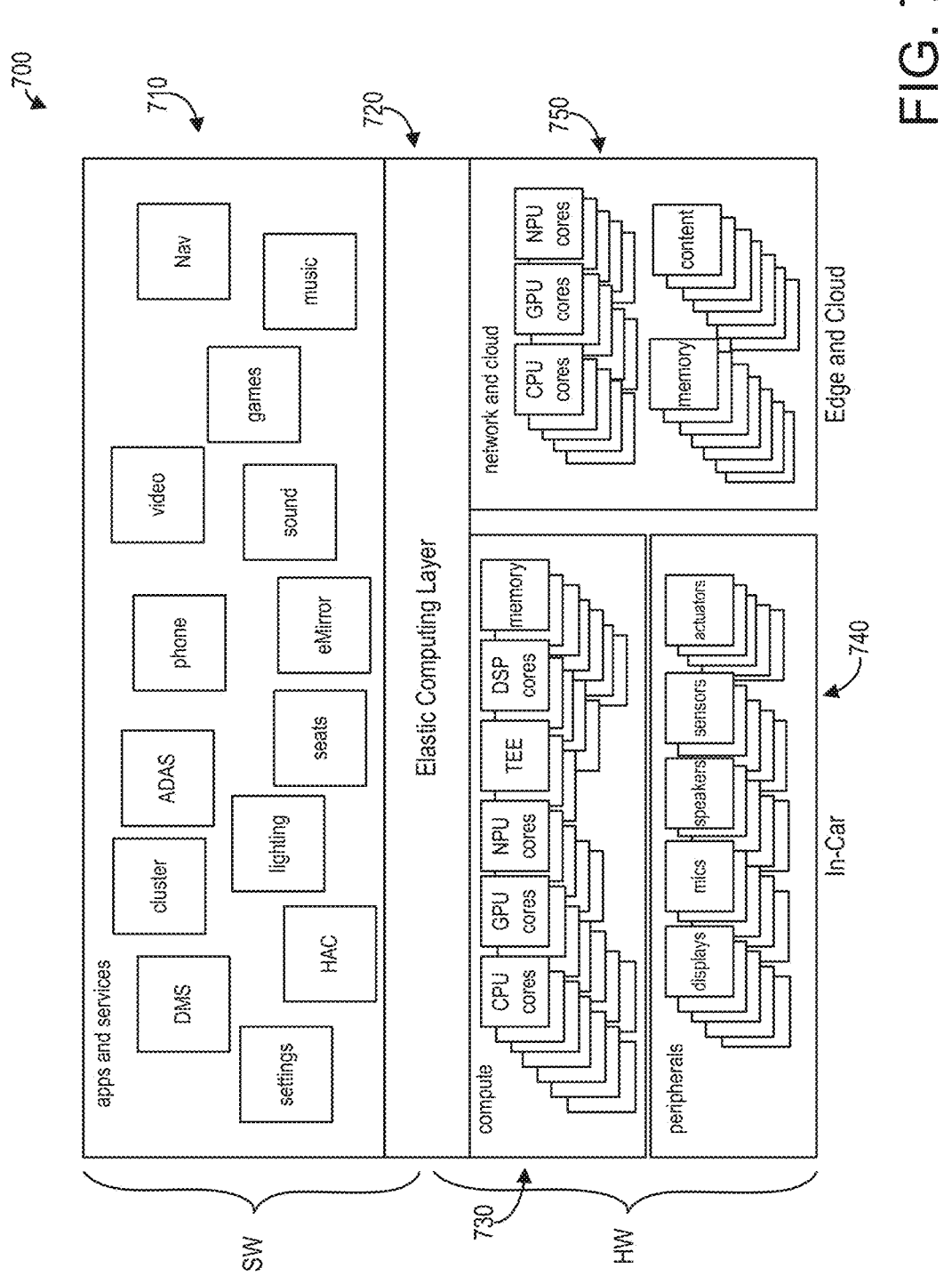
FIG. 7 is a block diagram of an elastic computing archi-tecture for in-vehicle processing, in accordance with one or more embodiments of the present disclosure.

FIG. 7 is a block diagram of an elastic computing architecture 700 for in-vehicle processing, in accordance with one or more embodiments of the present disclosure. A plurality of software applications and software services are depicted in a software layer 710. An elastic computing layer 720, which may comprise elastic computing module 236 described hereinabove with regard to FIG. 2, facilitates the execution of the software applications and services of software layer 710 by one or more components of the hardware layer. The hardware layer includes a plurality of computing devices 730 physically installed in the vehicle, including as illustrative examples a plurality of CPU cores, a plurality of GPU cores, a plurality of NPU cores, a plurality of TEEs, a plurality of DSP cores, and a plurality of memories. The hardware layer further includes a plurality of peripheral devices 740 physically installed in the vehicle such as displays, microphones, speakers, sensors, and actuators. The hardware layer further includes a plurality of network and cloud computing devices 750 including, as illustrative and non-limiting examples, a plurality of CPU cores, a plurality of GPU cores, a plurality of NPU cores, a plurality of memories, and a plurality of contents.

Elastic computing layer 720 understands the parameters of the in-vehicle hardware, such as the computing and memory capacities, which SoCs the peripherals are connected to, bus speeds, battery levels, temperatures, and so on. Elastic computing layer 720 further understands the parameters of the edge and cloud devices, such as the computing and memory capacities, the edge-to-edge latency, cost models, and so on. Elastic computing layer 720 further understands the needs of each of the software components in software layer 710, such as the computing bandwidth, memory, I/O, latency tolerance, safety, security, and so on.

Elastic computing layer 720 determines what runs in the vehicle on computing devices 730 and what runs in the cloud on cloud computing devices 750. The elastic computing layer 720 dynamically allocates the computing resources of the hardware layer, including the in-vehicle computing devices 730 and the cloud computing devices 750, to deterministically meet the software needs of software layer 710 and to load balance the system overall.

Elastic computing layer 720 further establishes guest environments for software running in the vehicle, and controls access to shared peripherals 740.

Figure 8:
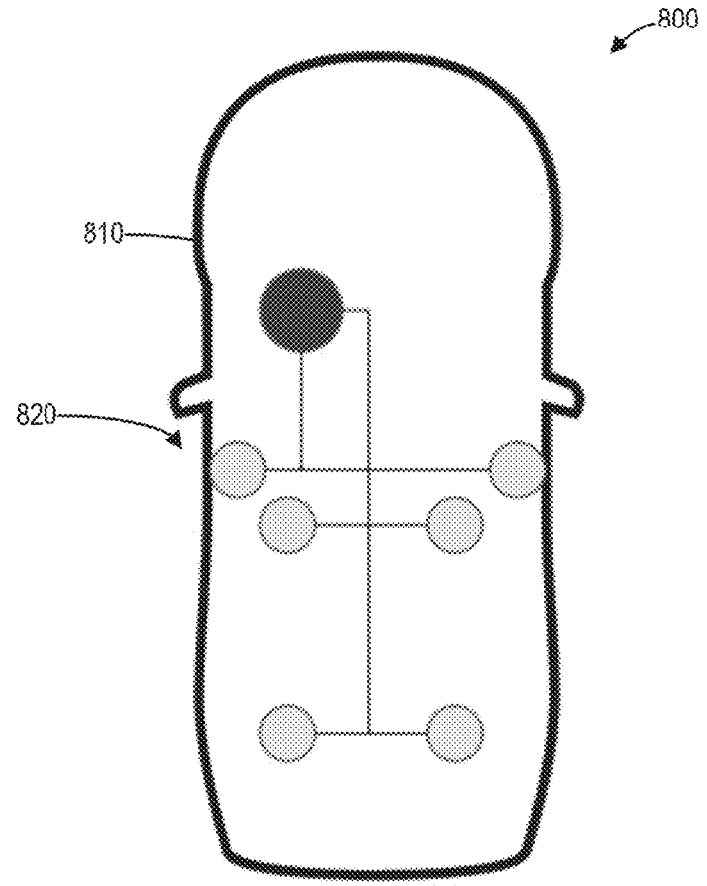
FIG. 8 is a block diagram depicting electronics partition-ing with separate controllers, in accordance with one or more embodiments of the present disclosure.

FIG. 8 is a block diagram 800 depicting electronics partitioning with separate controllers, in accordance with one or more embodiments of the present disclosure. A vehicle may include one or more domain controllers 810 such as the modules described hereinabove with regard to FIG. 3. Domain controllers 810 may be grouped by functional affinity, and are responsible for high-level functions. The domain controllers consolidate core software, controls, and user experience.

Furthermore, a plurality of zone controllers 820 may be distributed throughout the vehicle, and may be grouped by spatial synergies. Zone controllers 820 may, for example, be responsible for local sensor management and actuation, as well as power management. Partitioning electronics as depicted in FIG. 8 fosters software replacing hardware; optimizes cable harness, data sharing, functional fusion;

provides a single point of decision making; and simplifies configuration management, tiering, and upgrades.

Figure 9A:
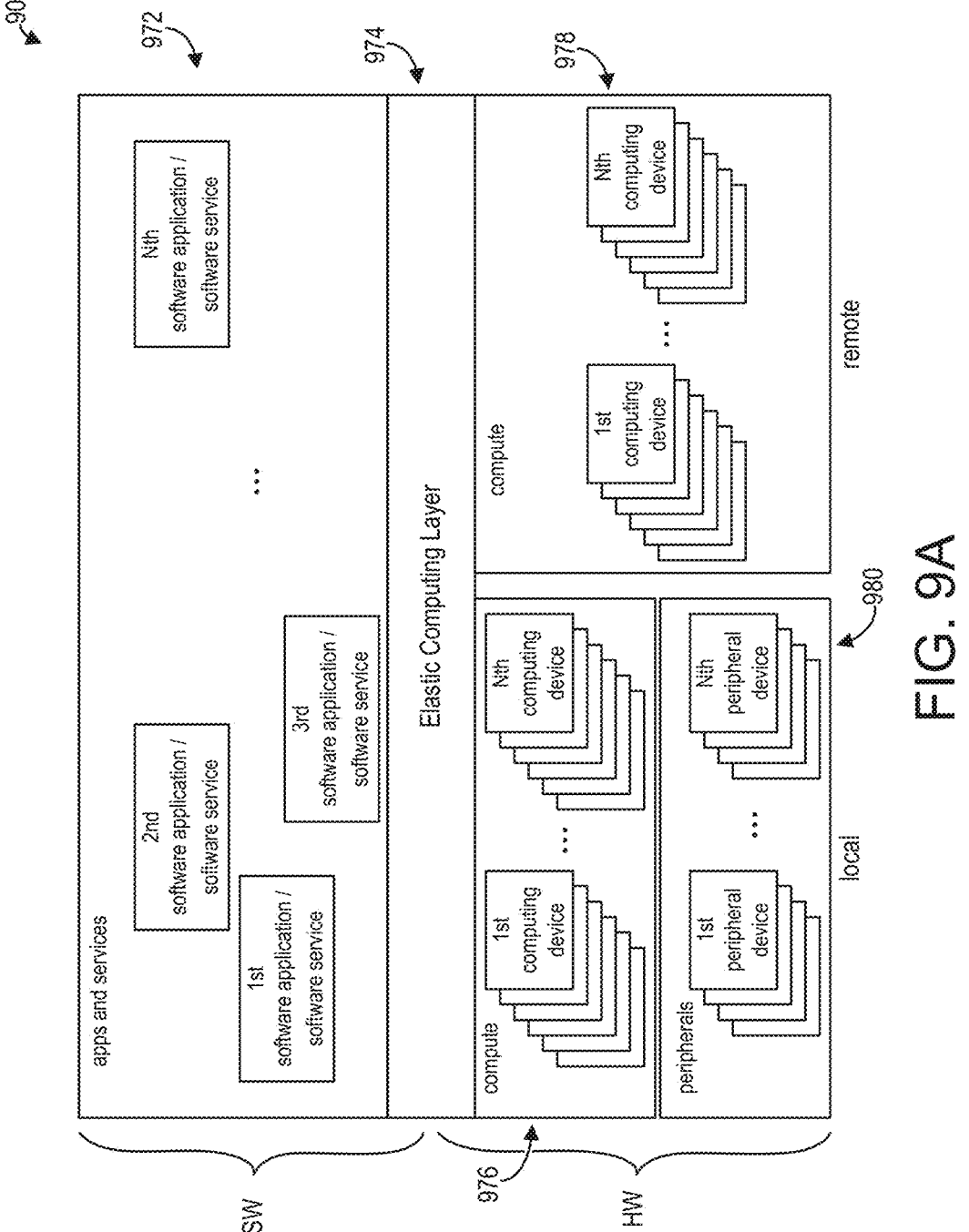
FIG. 9A is a block diagram of an elastic computing architecture for in-vehicle processing for an example vehicle, in accordance with one or more embodiments of the present disclosure.
Figure 9B:
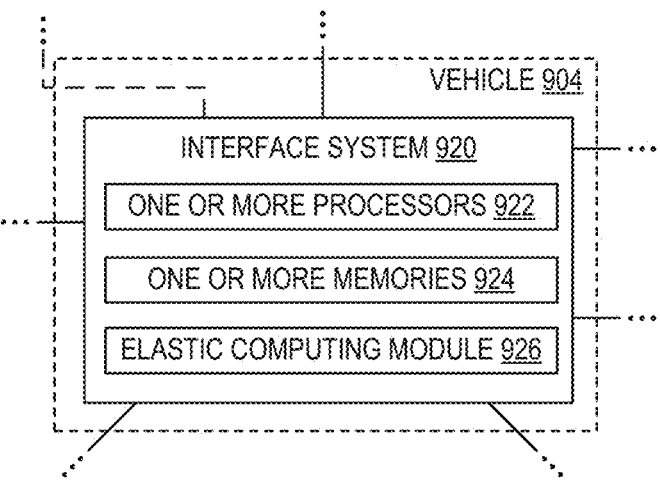
FIG. 9B is a block diagram of an in-vehicle interface system for the example vehicle, in accordance with one or more embodiments of the present disclosure.
Figure 9C:
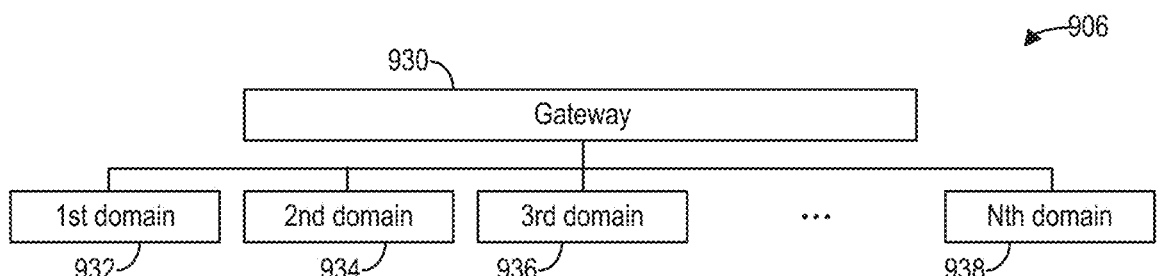
FIG. 9C is a block diagram of an architecture for domain-based partitioning of software processing for the example vehicle, in accordance with one or more embodiments of the present disclosure.

FIGS. 9A to 9C show various aspects of an elastic computing architecture for in-vehicle processing for an example vehicle, an in-vehicle interface system for the example vehicle, and an architecture for domain-based partitioning of software processing for the example vehicle, as discussed herein. Based on FIG. 9A, an elastic computing architecture 902 for in-vehicle processing includes an elastic computing layer 974, which in various embodiments may allocate processing of software applications to local computing resources and remote computing resources. Based on FIG. 9B, an in-vehicle interface system 920 of a vehicle 904 may comprise an elastic computing module 926, which may implement elastic computing layer 974. Additionally, based on FIG. 9C, elastic computing module 926 may partition software applications according to domains (e.g., domains of an architecture 906 for domain-based partitioning of software processing), and may allocate processing of software applications according to the partitions. (Elements of FIGS. 9A through 9C having the same names as the elements of other figures may be substantially similar to those elements, and may function or operate in a substantially similar manner, without being limited to operating or functioning in such a manner.)

Turning to FIG. 9A, elastic computing architecture 902 includes a software layer, a hardware layer, and elastic computing layer 974. The software layer includes one or more software applications and/or software services 972 (such as a first software application and/or service, a second software application and/or service, a third software application and/or service, and so on, to an Nth software application and/or service). The hardware layer includes one or more local computing devices 976 (such as a first computing device through an Nth computing device), one or more remote computing devices 978 (such as a first computing device through an Nth computing device), and one or more local peripheral devices 980 (such as a first peripheral device through an Nth peripheral device).

Local computing devices 976 may include various computing resources physically installed in, physically integrated within, and/or physically positioned in vehicle 904. Remote computing devices 978 may include various computing resources not physically installed in, not physically integrated within, and/or positioned away from vehicle 904.

Accordingly, local computing resources of elastic computing architecture 902 may comprise local computing devices 976, while remote computing resources of elastic computing architecture 902 may comprise remote computing devices 978. Each of the local computing resources and remote computing resources of elastic computing architecture 902 may comprise one or more cores (e.g., processor cores, such as such as CPU cores, GPU cores, NPU cores, DSP cores), TEEs, and/or memories, for example.

Local peripheral devices 980 may include various peripherals physically installed in, physically integrated within, and/or physically positioned in vehicle 904. Local peripheral devices may comprise various input and/or output devices, such as displays, microphones, speakers, sensors, and/or actuators.

Elastic computing layer 974 may be communicatively coupled to local computing resources (e.g., local computing devices 976) via wired communication links, or wireless communication links local to vehicle 904. Elastic computing layer 974 may also be communicatively coupled to remote computing resources (e.g., remote computing devices 978) via wireless communication links and/or networks extending to remote locations.

Elastic computing layer 974 may determine and/or understand various processing demands and/or needs of software applications and/or services 972, which may relate to computing bandwidth, memory, I/O, latency tolerance, safety, security, and so on. Elastic computing layer 974 may also determine and/or understand one or more parameters of local computing devices 976, such as their computing and/or memory capacities, which SoCs the various peripherals are connected to, bus speeds, battery levels, temperatures, and so on. Similarly, elastic computing layer 974 may determine and/or understand one or more parameters of remote computing devices 978, such as their computing and/or memory capacities, their edge-to-edge latencies, their cost models, and so on.

Elastic computing layer 974 may then facilitate the execution of one or more software applications and/or software services 972 by allocating processing of them among one or more local computing resources (e.g., local computing devices 976) and/or one or more remote computing devices 978 (e.g., remote computing devices 978). The allocation may be performed to best meet various processing demands and/or needs of software applications and/or software services 972. The allocation may also be performed to best meet a load-balancing objective (e.g., between a local load and a remote load). The allocation may be dynamic, and may change according to changes in the processing demands of software applications and/or services 972, the parameters and/or availability of the local computing resources, and the parameters and/or availability of the remote computing devices resources. The allocation may also be deterministic.

Meanwhile, turning to FIG. 9B, in-vehicle interface system 920 of vehicle 904 (which may be located within and/or integrated within vehicle 904) includes one or more processors 922 and one or more memories 924, in addition to elastic computing module 926. Similarly, one or more remote services, which may be communicatively coupled to vehicle 904 (e.g., via a wireless network), may include one or more processors and one or more memories.

Accordingly, local computing resources of in-vehicle interface system 920 may comprise processors 922 and memories 924, while remote computing resources of in-vehicle interface system 920 may comprise processors and memories of the remote services. Each processor 922 and/or processors of the remote services may comprise one or more SoCs (as with the processors of FIGS. 4-6, such as processor 530). In various embodiments, each SoC may in turn have one or more processor cores.

Elastic computing module 926 may be communicatively coupled to local computing resources (e.g., of processors 922 and/or memories 924) to vehicle 904, via either wired communication links or wireless communication links that are local to vehicle 904. Elastic computing layer 974 may also be communicatively coupled to remote computing resources (e.g., processors and/or memories of remote services) via wireless communication links extending to remote locations (e.g., through wireless networks). In some embodiments, two or more of processors 922 may be communicatively coupled to each other via a high-speed interface (e.g., PCIe, or a multi-gigabit Ethernet connection).

Elastic computing module 926 may determine and/or understand various processing demands and/or needs of software components (e.g., of in-vehicle interface system 920), which may relate to computing bandwidth, memory, I/O, latency tolerance, safety, security, and so on. Elastic computing module 926 may also determine and/or evaluate various parameters related to local computing resources, such as the computing and memory capacities of processors 922 and memories 924, the SoC architectures of processors 922 (to which in-vehicle peripherals may be connected), bus speeds, battery levels, temperatures, and so on. Similarly, elastic computing module 926 may also determine and/or evaluate various parameters of remote computing resources, such as computing and memory capacities of processors and memories of the remote services, edge-to-edge latencies, cost models, and so on.

Elastic computing module 926 may then allocate processing of the software components among one or more local computing resources (e.g., processors 922 and/or memories 924) and/or one or more remote computing resources (e.g., processors and/or memories of remote services). The allocation may be performed to best meet various processing demands and/or needs of the software components. The allocation may also be performed to best meet a load-balancing objective (e.g., between a local load and a remote load). The allocation may be dynamic, and may change according to changes in the processing demands of the software components, the parameters and/or availability of the local computing resources, and the parameters and/or availability of the remote computing devices resources. The allocation may also be deterministic.

Turning to FIG. 9C, architecture 906 for domain-based partitioning of software processing may comprise a central gateway 930 and one or more domains into which software for vehicle 904 may be partitioned (such as a first domain 932, a second domain 934, a third domain 936, and so on, to an Nth domain 938). The domains of architecture 906 may reflect functional affinity groupings, may reflect high-level function responsibilities, and/or may otherwise reflect various portions of, or aspects of, vehicle 904. For example, various domains may be substantially similar to the domains of cabin module 320, telematics module 330, drive & ADAS module 340, chassis module 350, and/or drivetrain module 360 of FIG. 3.

Moreover, processing for the various domains may be allocated to various computing resources. Processing for one or more of the domains may be allocated to a single processor, a single SoC within a processor, and/or a single processor core within a processor and/or within an SoC. Alternatively, processing for more than one domain may be allocated to separate processors, or separate SoCs within a processor, or separate cores within a processor and/or within an SoC. In various embodiments, processing for the various domains may be allocated in various combinations of the above.

Accordingly, elastic computing module 926 may partition software processing for vehicle 904 according to various domains, such that domain-specific processing is allocated to various sets of computing resources. The computing resources allocated to process the domains may vary between different embodiments. In various embodiments, the allocation of computing resources may relate to processing demands and/or needs of software, such as computing bandwidth, memory, I/O, latency tolerance, safety, security, and so on. For example, in some embodiments, allocation of computing resources may relate to a software-demanded safety parameter (e.g., an Automotive Safety Integrity Level (ASIL) level). In some embodiments, computing resources may be allocated to computing resources in accordance with domain controllers and zone controllers as discussed herein (e.g., with respect to FIG. 8).

Moreover, the partitioning of the domains and/or the allocation of the underlying computing resources may be dynamic, and may change according to changes in software processing demands, the parameters and/or availability of local computing resources, and the parameters and/or availability of remote computing devices resources. The processing capability allocated to various domains may accordingly be extended.

In accordance with FIGS. 9A through 9C, elastic computing module 926 may receive processing parameters related to the computing resources from the computing resources. Elastic computing module 926 may also establish control signaling for the computing resources.

In some embodiments, elastic computing module 926 may allocate software processing to a single SoC with multiple cores. For some embodiments, elastic computing module 926 may allocate software processing to multiple SoCs (any of which may have one or more cores). In various embodiments, elastic computing module 926 may allocate software processing to various combinations of single SoCs with one or more cores and/or multiple SoCs with one or more cores. In embodiments in which elastic computing module 926 allocates software processing to multiple SoCs, the SoCs may be communicatively coupled via an interconnect (which may be, e.g., a cache-coherent interconnect, a PCIe interconnect, an Ethernet interconnect, and so on).

In some embodiments, elastic computing module 926 may have access to clocking units, power units, and/or thermal-management units for computing resources. For example, elastic computing module 926 may have access to dedicated mechanisms for separate adjustment of voltage, power gating, clocking, and clock gating of one or more processing cores. Elastic computing module 926 may also have access to, for example, fused voltage values corresponding with a range of operating performance points for various computing resources. For some embodiments, elastic computing module 926 may have access to mechanisms supporting dynamic voltage and frequency scaling and/or adaptive voltage scaling. In various embodiments, elastic computing module 926 may be able to read working temperatures from one or more cores, read average current and/or power dissipation for a computing engine, and/or read peak current and/or power dissipation for a computing engine.

For various embodiments, elastic computing module 926 may read performance counters and/or load counters for one or more computing engines (e.g., processors, cores, and/or SoCs). The performance counters and/or load counters may differentiate between the software (e.g., source, application, and/or task) producing the counter metrics. In various embodiments, elastic computing module 926 may read read-traffic counters and/or write-traffic counters for one or more interconnects. The read-traffic counters and/or write-traffic counters may clearly differentiate between the software (e.g., source and application) producing the traffic.

For some embodiments, elastic computing module 926 may dynamically change an operating performance point of a memory computing resource (such as Dynamic Random Access Memories (DRAM)) as a function of factors such as system load and software demand for memory bandwidth. In some embodiments, elastic computing module 926 may take into account a current available throughput on the basis of parameters such as memory temperature, memory refresh rate, and/or memory throughput (e.g., as captured by a counter).

In various embodiments, elastic computing module 926 may prioritize various tasks (e.g., software processing) and/ or may support the specification or definition of a guaranteed execution time based upon priority. In some embodiments, if execution time of a high-priority task is critical, elastic computing module 926 may interrupt tasks with lower priorities (e.g., by deallocating computing resources allocated to them) to guarantee execution of the high-priority task (e.g., in a predetermined time). If it is possible to execute the high-priority task in a predetermined time, then elastic computing module 926 might not interrupt tasks with lower priorities.

In various embodiments, elastic computing module 926 may dynamically allocate and/or partition computing resources (e.g., as discussed herein), and may also define memory space regions for dedicated partitions or domains. This may advantageously facilitate and/or ensure domain separation (e.g., freedom from interference) which may in turn facilitate and/or ensure software demands related to safety, for example. To support software safety demands (such as demands for relatively high ASIL levels), in some embodiments, elastic computing module 926 may deallocate a computing resource (e.g., a processing core) allocated to a software application, execute one or more on-device tests (e.g., a Logic Built-In Self-Test (LBIST) test and/or other tests) to determine whether the computing resource has any detectable issues, and if not to re-allocate the computing resource to the software application.

For some embodiments, elastic computing module 926 may have access to counters for computing resources (e.g., processing cores) that indicate the available time, or availability, of the computing resources. Elastic computing module 926 may account for this data in allocating software processing to various computing resources (e.g., on the basis of actual resource availability within the computing resources).

In some embodiments, elastic computing module 926 may have access (e.g., via counters or performance monitors) to data regarding latency inside an SoC, and/or for one or more paths within the SoC. Elastic computing module 926 may also have access (e.g., via counters or performance monitors) to data regarding latency at various interfaces (such as cache-coherent interconnect interfaces, PCIe interfaces, Ethernet interfaces, and so on).

Accordingly, in various embodiments, elastic computing module 926 may have access to a wide variety of data and/or control mechanisms for allocating software processing among various computing resources. For some embodiments, elastic computing module 926 may use a neural network, which in turn may recognize persons in vehicle 904, observe status and/or behavior of a driver and/or one or more passengers, and employ machine learning to predict how various users may wish to use the system in advance.

Figure 10:
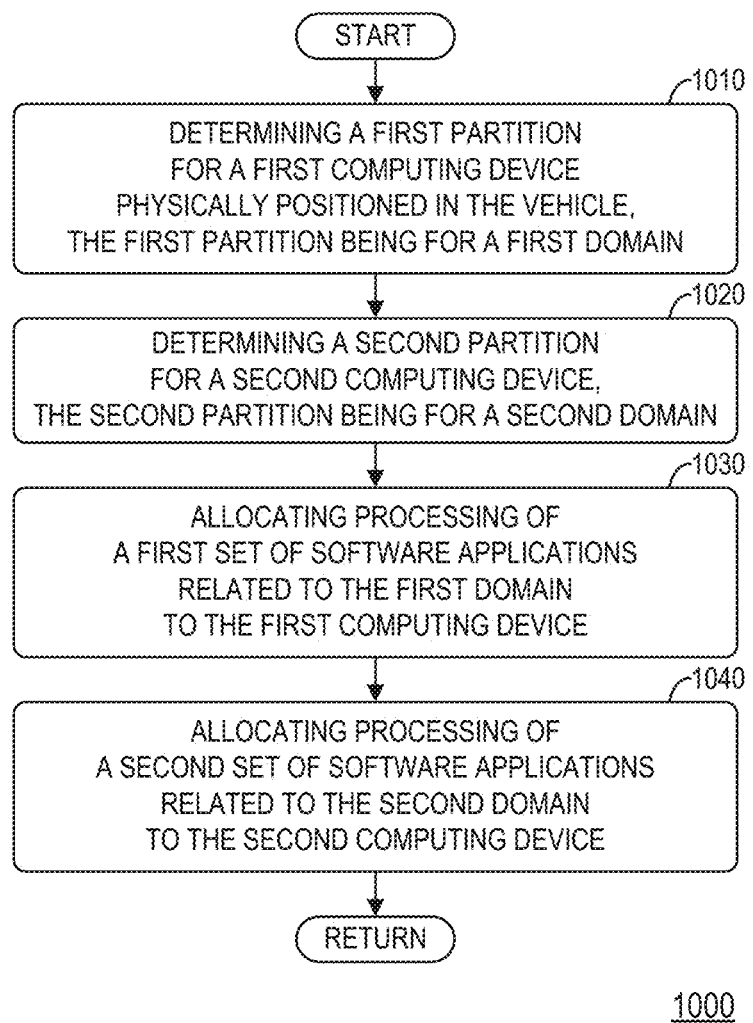
FIG. 10 shows a method for in-vehicle elastic computing, in accordance with one or more embodiments of the present disclosure.

FIG. 10 shows an example method 1000 for in-vehicle elastic computing. Method 1000 may comprise a first determining 1010, a second determining 1020, a first allocating 1030, and a second allocating 1040. In first determining 1010, a first partition may be determined for a first computing device physically positioned in the vehicle, the first partition being for a first domain. In second determining 1020, a second partition may be determined for a second computing device, the second partition being for a second domain. In first allocating 1030, processing of a first set of software applications related to the first domain may be allocated to the first computing device. In second allocating 1040, processing of a second set of software applications related to the second domain may be allocated to the second computing device.

In some embodiments, the second computing device may be a remote computing device. For some embodiments, the first domain may encompass a first safety category, and the second domain may encompass a second safety category. In some embodiments, the first computing device may include a first SoC and the second computing device may include a second SoC. For some embodiments, the first domain may encompass one or more chassis capabilities, or one or more drivetrain capabilities, or both. In various embodiments, the first computing device and/or the second computing device may include one or more CPUs, one or more GPUs, one or more NPUs, one or more DSPs, and/or one or more memory devices.

In various embodiments, processing for a software application may be allocated to either the first computing device or the second computing device based upon a demanded safety parameter of the software application, one or more processing parameters of the first computing device, and one or more processing parameters of the second computing device. For some embodiments, the first set of processing parameters and/or the second set of processing parameters may comprise a computing capacity and/or a memory capacity.

For various embodiments, an elastic computing module, as disclosed herein, may be configured to perform various portions of method 1000 and/or various methods disclosed herein. In some embodiments, the elastic computing module may be configured to establish a guest environment for a guest operator of the vehicle to access the software application with limited access. For some embodiments, the elastic computing module may be configured to control access to one or more peripheral devices.

In various embodiments, elastic computing module 926 may be configurable to perform part or all of the various methods disclosed herein. In some embodiments, elastic computing module 926 may include a custom-developed circuitry (e.g., an Application-Specific Integrated Circuit (ASIC) component and/or a Field Programmable Gate Array (FPGA) device). In some embodiments, elastic computing module 926 may comprise one or more processors and a memory for holding executable instructions which, when executed, may cause the one or more processors to perform part or all of the methods disclosed herein. For some example embodiments, elastic computing module 926 may be at least partially implemented by processors 922 and/or memories 924.

An elastic computing layer and/or elastic computing module as discussed herein may advantageously distribute software processing among computing resources in a dynamic and adaptive manner. In turn, this may advantageously promote consolidation of system resources, flexibility of processing, decreased system costs, and optimized system output relative to different metrics (e.g., performance, energy usage, minimization of component aging, and so on). These advantages may be independent of the specifics of the software implementation and/or hardware implementation.

In a first approach to the methods and systems discussed herein, a first example of a system for controlling a vehicle comprises: a first computing device physically positioned in the vehicle; a second computing device positioned away from the vehicle; and an elastic computing module communicatively coupled to the first computing device and the second computing device, the elastic computing module being configured to: determine computing and memory capacities of the first computing device and the second computing device; determine software demands of a software application for controlling a component of the vehicle; and dynamically allocate processing of the software application to the first computing device and/or the second computing device based on the computing and memory capacities of the first and second computing devices and the software demands of the software application. Building off of the first example, in a second example of the system, the first computing device includes one or more of: a plurality of CPUs; a plurality of GPUs; a plurality of NPUs; a plurality of DSPs; and a plurality of memory devices. Building off of the second example, in a third example of the system, the second computing device comprises one or more of a second plurality of CPUs, a second plurality of GPUs, a second plurality of NPUs, and a second plurality of memory devices. Building off of any of the first example through the third example, in a fourth example of the system, the elastic computing module is further configured to establish a guest environment for a guest operator of the vehicle to access the software application with limited access. Building off of any of the first example through the fourth example, a fifth example of the system further comprises: a plurality of peripheral devices, wherein the elastic computing module is further configured to control access to one or more peripheral devices of the plurality of peripheral devices. Building off of any of the first example through the fifth example, in a sixth example of the system, the software application comprises a plurality of software applications; the elastic computing module partitions the plurality of software applications according to a domain of each software application; and the elastic computing module allocates processing of each software application according to the partitions of the plurality of software applications.

In a second approach to the methods and systems discussed herein, a first example of an in-vehicle interface system comprises: one or more communication links configured to communicatively couple to a first local computing device, to a second local computing device, or to both; and an elastic computing module communicatively configured to couple to the first local computing device and the second local computing device, the elastic computing module being configured to: determine a first set of processing parameters of the first local computing device and a second set of processing parameters of the second local computing device; establish a demanded safety parameter of a software application for the vehicle; and allocate processing of the software application among the first local computing device and the second local computing device to meet the demanded safety parameter of the software application, based upon the first set of processing parameters and the second set of processing parameters. Building off of the first example, in a second example of the in-vehicle interface system, the first set of processing parameters and the second set of processing parameters comprise at least one of: computing capacities, and memory capacities. Building off of either the first example or the second example, a third example of the in-vehicle interface system further comprises: a first SoC and a second SoC, wherein the first local computing device includes the first SoC; and wherein the second local computing device includes the second SoC. Building off of any of the first example through the third example, in a fourth example of the in-vehicle interface system, a first processing partition of the system is implemented to include the first device; and a second processing partition of the system is implemented to include the second device. Building off of the fourth example, in a fifth example of the in-vehicle interface system, the first processing partition is implemented on a first SoC of the system; and the second processing partition is implemented on a second SoC of the system. Building off of either the fourth example or the fifth example, in a sixth example of the in-vehicle interface system, the first processing partition handles processing related to one or more chassis capabilities, or one or more drivetrain capabilities, or both. Building off of the sixth example, in a seventh example of the in-vehicle interface system of claim 6, the first processing partition is associated with a first safety class; and the second processing partition is associated with a second safety class. Building off of any of the first example through the seventh example, in an eighth example of the in-vehicle interface system, the communication link is configured to communicatively couple to the first local computing device; and the in-vehicle interface system further comprises a second communication link configured to communicatively couple to the second local computing device. Building off of any of the first example through the eighth example, in a ninth example of the in-vehicle interface system of any of claim 1 through 8, the in-vehicle interface system further comprises an additional communication link configured to communicatively couple to a remote computing device; and the elastic computing module is further configured to: determine a third set of processing parameters of the remote computing device; establish a demanded safety parameter of an additional software application for the vehicle; and allocate processing of the software application among the first local computing device, the second local computing device, and the remote computing device based upon the first set of processing parameters, the second set of processing parameters, and the third set of processing parameters, to meet the demanded safety parameter of the software application.

In a third approach to the methods and systems discussed herein, a first example of a method for in-vehicle elastic computing comprises: determining a first partition for a first computing device physically positioned in the vehicle, the first partition being for a first domain; determining a second partition for a second computing device, the second partition being for a second domain; allocating processing of a first set of software applications related to the first domain to the first computing device; and allocating processing of a second set of software applications related to the second domain to the second computing device. Building off of the first example, in a second example of the method for in-vehicle elastic computing, the second computing device is a remote computing device. Building off of either the first example or the second example, in a third example of the method for in-vehicle elastic computing, the first domain encompasses a first safety category, and the second domain encompasses a second safety category. Building off of any of the first example through the third example, in a fourth example of the method for in-vehicle elastic computing, the first computing device includes a first SoC, and the second computing device includes a second SoC. Building off of any of the first example through the fourth example, in a fifth example of the method for in-vehicle elastic computing, the first domain encompasses one or more chassis capabilities, or one or more drivetrain capabilities, or both.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and cloud computing systems described above with respect to FIGS. 1 through 9C. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. An in-vehicle system, comprising:
one or more communication links configured to communicatively couple to a first local computing device, and to a second local computing device; and
an elastic computing module communicatively configured to couple to the first local computing device and the second local computing device, the elastic computing module comprising one or more processors and a memory for holding executable instructions which, when executed, cause the one or more processors to:
determine a first set of processing parameters of the first local computing device and a second set of processing parameters of the second local computing device;
establish a demanded safety parameter of a software application for the vehicle, the demanded safety parameter including an Automotive Safety Integrity Level (ASIL) level; and
dynamically allocate processing of the software application among the first local computing device and the second local computing device to meet the demanded safety parameter of the software application, based upon the first set of processing parameters and the second set of processing parameters, wherein the first set of processing parameters and the second set of processing parameters comprise computing capacities and memory capacities, and wherein the dynamic allocation is further based on load-balancing between a local load and a remote load, the dynamic allocation changing according to changes in processing demands of the software application, availability of local computing resources, and availability of remote computing devices resource, including:
in response to a predetermined safety demand of the ASIL level,
deallocate a computer processing resource including a processing core allocated to the software application, execute one or more on-device tests including a logic built-in self-test to determine whether the computer processing resource has any detectable issues, then, only if the computer processing resource has no detectable issues, re-allocate the computer processing resource to the software application, and execute the software application with the re-allocated computer processing resource, wherein a first processing partition handles processing related to one or more chassis capabilities, or one or more drivetrain capabilities, or both.

2. The in-vehicle system of claim 1, wherein the first set of processing parameters and the second set of processing parameters comprise at least one of: computing capacities, and memory capacities.

3. The in-vehicle system of claim 1, further comprising:

a first System-on-Chip (SoC) and a second SoC, wherein the first local computing device includes the first SoC; and wherein the second local computing device includes the second SoC.

4. The in-vehicle system of claim 1, wherein the first processing partition of the system is implemented to include the first device; and wherein a second processing partition of the system is implemented to include the second device, and wherein the partitions are domains.

5. The in-vehicle system of claim 4, wherein the first processing partition is implemented on a first System-on-Chip (SoC) of the system; and wherein the second processing partition is implemented on a second SoC of the system.

6. The in-vehicle system of claim 1, wherein the communication link is configured to communicatively couple to the first local computing device; and wherein the in-vehicle system further comprises a second communication link configured to communicatively couple to the second local computing device.

7. The in-vehicle system of claim 1, wherein the in-vehicle system further comprises an additional communication link configured to communicatively couple to a remote computing device; and wherein the elastic computing module is further configured to:

determine that the first local computing device includes a first System-on-Chip (SoC), and the second local computing device includes a second SoC; and allocate processing of the software application among the first local computing device, the second local computing device, and the remote computing device based upon the first set of processing parameters and the second set of processing parameters to meet the demanded safety parameter of the software application.

8. The in-vehicle system of claim 1, further comprising an elastic computing architecture for in-vehicle processing including a plurality of software applications and software services in a software layer, a hardware layer, and an elastic computing layer facilitating the execution of the plurality of software applications and services of the software layer by one or more components of the hardware layer, the hardware layer including the first and second local computing devices physically installed in the vehicle, the hardware layer further including a plurality of peripheral devices physically installed in the vehicle including displays, speakers, sensors, and actuators, the hardware layer further including a plurality of network and cloud computing devices, wherein the elastic computing layer includes the elastic computing module.

9. The in-vehicle system of claim 1, wherein the elastic computing module dynamically partitions computing resources and also defines memory space regions for dedicated domains to facilitate domain separation, including freedom from interference, which in turn facilitates software demands related to safety.

10. The in-vehicle system of claim 1, wherein executing the one or more on-device tests includes determining the computer processing resource does not have any detectable issues, and wherein the computer processing resource re-allocated to the software application is a same computer processing resource and the software application is a same software application.

11. The in-vehicle system of claim 1, wherein the computer processing resource re-allocated to the software application is a same computer processing resource and the software application is a same software application.

12. A method for in-vehicle elastic computing, the method carried out via one or more processors and a memory for holding executable instructions which, when executed, cause the one or more processors to carry out the method, the method comprising:

determining a first partition for a first computing device physically positioned in the vehicle, the first partition being for a first domain;

determining a second partition for a second computing device, the second partition being for a second domain;

allocating processing of a first set of software applications related to the first domain to the first computing device;

allocating processing of a second set of software applications related to the second domain to the second computing device, wherein the first domain encompasses a first safety category including one or more of chassis capabilities and drivetrain capabilities, and the second domain encompasses a second safety category including one or more of cabin capabilities, telematics capabilities, and drive and Advanced Driver Assistant Systems (ADAS) capabilities, in response to a predetermined safety demand of the ASIL level:

deallocating a computer processing resource including a processing core allocated to a software application, executing one or more on-device tests including a logic built-in self-test to determine whether the computing resource has any detectable issues, determining the computing resource does not have any detectable issues, then, responsive to determining the computer processing resource has no detectable issues, and only if the computer processing resource has no detectable issues, re-allocating the computer processing resource to the software application, and executing the software application with the re-allocated computer processing resource.

13. The method for in-vehicle elastic computing of claim 12, wherein the second computing device is a remote computing device.

14. The method for in-vehicle elastic computing of claim 12, further comprising specifying a guaranteed execution time for a task and, for a critical execution time, interrupt tasks with lower priorities by deallocating computing resources to guarantee execution of the task in a predetermined time.

15. The method for in-vehicle elastic computing of claim 12, wherein the first computing device includes a first System-on-Chip (SoC); and wherein the second computing device includes a second SoC.

16. The method for in-vehicle elastic computing of claim 12, wherein the first domain encompasses one or more chassis capabilities, or one or more drivetrain capabilities, or both.

17. The method for in-vehicle elastic computing of claim 12, wherein the computer processing resource re-allocated to the software application is a same computer processing resource and the software application is a same software application.

* * * * *